United States Patent [19]

Krieger

[11] Patent Number: 5,175,812
[45] Date of Patent: Dec. 29, 1992

[54] SYSTEM FOR PROVIDING HELP INFORMATION DURING A HELP MODE BASED ON SELECTED OPERATION CONTROLS AND A CURRENT-STATE OF THE SYSTEM

[75] Inventor: John J. Krieger, Andover, Mass.

[73] Assignee: Hewlett-Packard Company, Palo Alto, Calif.

[21] Appl. No.: 707,231

[22] Filed: May 20, 1991

Related U.S. Application Data

[63] Continuation of Ser. No. 277,723, Nov. 30, 1988, abandoned.

[51] Int. Cl.$^5$ .............................................. G06F 3/14
[52] U.S. Cl. ................................... 395/156; 395/155; 395/275; 364/DIG. 2; 364/948.1; 364/948.2; 364/948.22
[58] Field of Search ... 364/200 MS File, 900 MS File, 364/518; 395/155, 156, 275

[56] References Cited

U.S. PATENT DOCUMENTS

| | | | |
|---|---|---|---|
| 3,737,863 | 6/1973 | Rowland et al. | 364/200 |
| 4,212,465 | 8/1980 | Huelsman | 340/347 AD |
| 4,622,013 | 11/1986 | Cerchio | 434/118 |
| 4,648,062 | 3/1987 | Johnson et al. | 364/900 |
| 4,731,735 | 3/1988 | Borgendale et al. | 364/200 |
| 4,739,477 | 4/1988 | Barker et al. | 364/200 |
| 4,789,962 | 12/1988 | Berry et al. | 364/900 |
| 4,887,306 | 12/1989 | Hwang et al. | 382/54 |
| 4,899,276 | 2/1990 | Stadler | 340/721 |
| 4,964,077 | 10/1990 | Eisen et al. | 395/275 |
| 4,970,678 | 11/1990 | Sladowski et al. | 364/900 |
| 4,992,972 | 2/1991 | Brooks et al. | 364/900 |
| 5,029,113 | 7/1991 | Miyoshi et al. | 364/521 |

FOREIGN PATENT DOCUMENTS 0185845  7/1986  European Pat. Off. .

OTHER PUBLICATIONS

Gwei et al.; "Toward a Consultative On-Line Help System" Int. J. Man-machine studies (1990) 32, 363-383.
"APS Test Search and Retrieval"; Planning Research Corp.; Nov. 1987; pp. 1-3 to 1-8.
Nashua 7150C Operating Instructions, Nashua, Japan, pp. 7 and 12.
Pages from "Lotus 1-2-3 Release 3" Reference Manual 1989.
Pages from "Wordperfect" for IBM Personal Computers Version 50 1989.

Primary Examiner—Lawrence E. Anderson
Assistant Examiner—Krisna Lim

[57] ABSTRACT

A system for displaying "help" information concerning the functioning of the controls of an electronic system. A "help" control is provided which, when operated, places the system in a "help" mode. When the system is in the "help" mode, system controls are disabled from performing their normal function and, in response to the operation of a control and were appropriate to an indication of the current state of the system, a selected "help" text is displayed. The system is adapted to operate for both analog and digital controls and to provide the "help" text in a window on the display so that normal operation of the system may continue while the "help" text is being displayed.

15 Claims, 2 Drawing Sheets

SYSTEM FOR PROVIDING HELP INFORMATION DURING A HELP MODE BASED ON SELECTED OPERATION CONTROLS AND A CURRENT-STATE OF THE SYSTEM

CROSS REFERENCE TO RELATED APPLICATION

This application is a continuation of application Ser. No. 07/277,723, filed Nov. 30, 1988, now abandoned.

FIELD OF THE INVENTION

This invention relates to systems having multiple controls and a video display output and more particularly to a method and apparatus for causing selected information concerning the function of any of said controls to be displayed on said video display to assist the user in utilizing the system.

BACKGROUND OF THE INVENTION

As the use of electronic computer-controlled systems becomes increasingly pervasive, the systems are also becoming more complex. The result is that operators of such systems frequently are not fully trained in their use and may not be familiar with all of the capability of the system o what system controls to use in a given situation. The problem is complicated by the fact that the function of a particular control, such as "soft key" controls, may vary with the state or use of the system or otherwise with what has been done before.

While manuals may be available for obtaining such information, trying to look up information in a manual is not normally feasible while the system is on line. As a result, users frequently determine the function of a particular control empirically by trying the control and seeing what happens. While this mode of operation may be suitable in some applications, there are many applications, such as applications in the medical field, where such an empirical approach could be disastrous.

A need therefore exists for providing users of such systems with a "help" function which permits them to gain immediate information concerning the operation of the system on request. Heretofore, to the extent such functions have been available, they have normally operated in a menu mode. More particularly, when the user realizes that he needs further information, he operates a "help" control which causes a menu of available aids to be displayed. By operating a cursor, or a key, or by other standard means, the user then makes a selection from the menu which may either cause an additional menu or alphanumeric information explaining a particular function to appear on the screen.

While such "help" functions are useful, they have limitations. First, they normally fill the entire screen when in use preventing viewing of normal screen display. Second, the menu format is not necessarily ideally suited for easily permitting an operator to determine the function of a particular control. Third, the controls on which information is provided are generally digital controls. Frequently, such information is not available for dials, sliders, or other analog-type controls. Finally, such functions do not necessarily take into account variations in the function of a control based on use or state of the system or on other factors.

A simpler and easier mode of operation would be for a user to be able to determine the function of a particular control by merely operating the control in its normal fashion without having the function actually be performed with the possible adverse results which might result therefrom. While some systems are available which operate in this way, such systems generally are not adapted to take into account variations in the functions of a control depending on the state of the systems, and generally utilize the entire screen, precluding the continued operation of the system when in a "help" mode. Such systems are also generally limited to use with digital controls rather than to use with both analog and digital controls.

It is therefore the object of this invention to provide an improved method and apparatus for providing the "help" function in a computer-controlled electronic system which method and apparatus overcomes the limitations indicated above.

SUMMARY OF THE INVENTION

In accordance with the above, this invention provides a method and apparatus for displaying information concerning the functioning of a plurality of controls in a system which is adapted to operate in a plurality of different states and which has a video display output. The system has a "help" control which, when operated, places the system in a "help" mode. When in the "help" mode, at least selected ones of the plurality of controls are disabled from performing their normal functions and, in response to the operation of one of said controls, selected information concerning the control for the current state of the system is displayed on the video display. A suitable means is also provided for taking the system out of the "help" mode. For a preferred embodiment, the system is taken out of the "help" mode in response to a second operation of the "help" control, the selected information concerning a control is displayed in a window on the video display with information being displayed prior to the system going into the "help" mode continuing to be displayed, and the plurality of controls includes both analog and digital controls.

The foregoing and other objects, features and advantages of the invention will be apparent from the following more particular description of a preferred embodiment of the invention as illustrated in the accompanying drawings.

IN THE DRAWINGS

DETAILED DESCRIPTION

Figure 1:
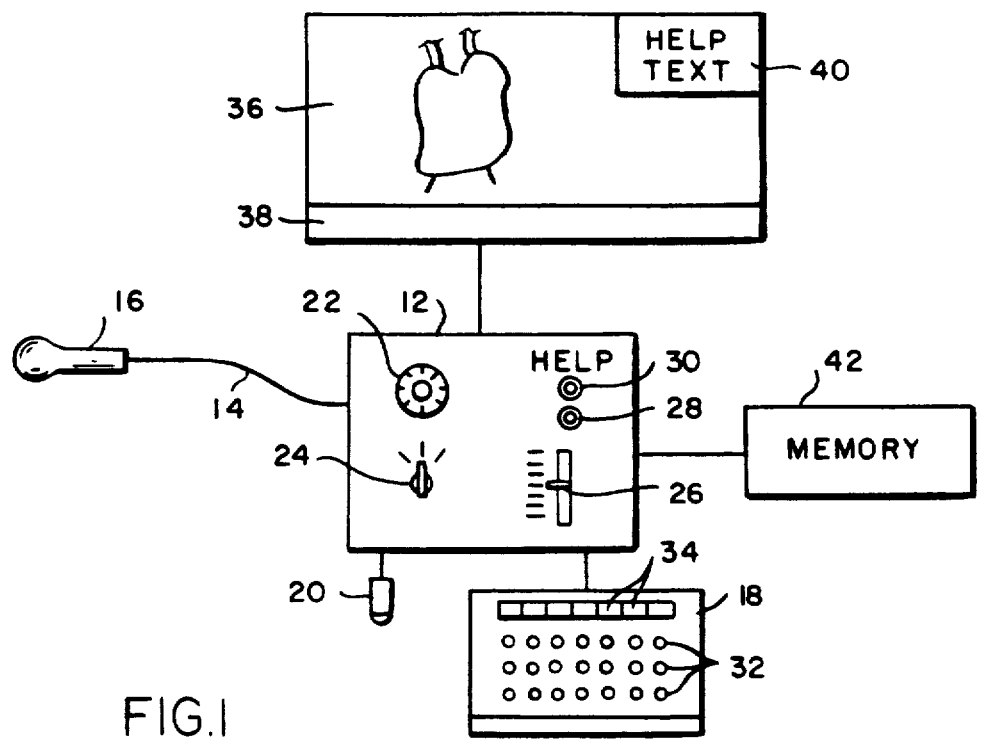
FIG. 1 is a schematic diagram of a system in which the teachings of this invention may be utilized.

FIG. 1 illustrates a medical ultrasonic scanning system in which the teachings of this invention may be utilized. The system includes a system processor 12 which may apply signals over a line 14 to control the operation of an ultrasonic transducer 16 and may receive ultrasonic echo signals from the transducer 16. The processor 12 receives control input from a plurality of standard controls such as a keyboard 18, a track ball or mouse 20, an analog dial 22, a multiposition switch 24, a slider control 26, and a button 28. The processor also has a "help" button control 30 the function of which will be discussed later. Keyboard 18 has a plurality of alphanumeric keys and keys with fixed control functions, which are illustrated by the keys 32, and also has a plurality of "soft keys" 34 the function of which varies with the state of the system. Additional soft controls may be provided by one or more pop up screens or windows which appear on a display 36 and which are selected by moving a cursor under control of track-ball 20 or other suitable control.

By operating various ones of the controls 18-34, the system may be placed in any one or more of a plurality of different states, the state of the system controlling the function being performed by the ultrasonic transducer and the information which is displayed on output display device 36. Output display 36 is controlled in standard fashion to provide an image of what is being scanned by transducer 16. The image may, for example, be an image of a heart, lung or other organ as shown in FIG. 1, a Doppler image illustrating the direction and velocity of blood flow through certain body channels, a combination of image and Doppler or some other form of standard ultrasonic display. Various standard textural information may also be provided on the screen, for example, in the area 38 thereof. In addition, in accordance with the teachings of this invention, when the "help" button 30 is operated, a window 40 may be provided on the screen in which certain "help" text is provided.

The system also includes a memory 42 which interfaces with processor 12 and which stores various information including state variables which indicate the current state of the system (i.e., the functions which the system is currently performing), where the system is in performing operations which it is performing, and certain other control information. The memory also stores a "help" text for each of the system controls including a separate "help" text for each key 32 and 34. Since the function of a particular key or other control, and in particular the function of each of the soft keys 34, may vary with the state of the system, two or more texts may be stored for a given control with the appropriate text for a given control depending on the current state of the system when the "help" button 30 and the control are operated.

Figure 2:
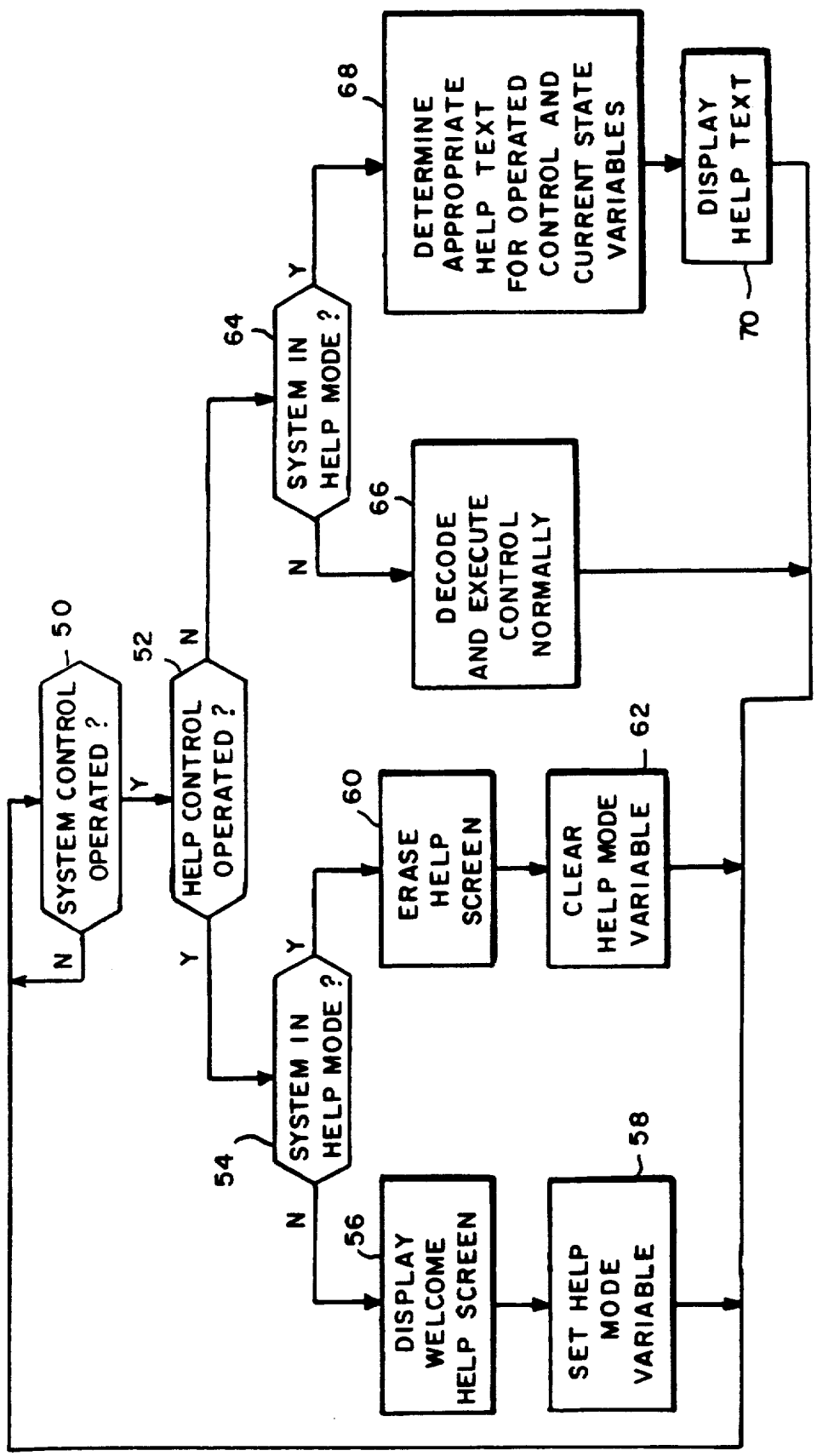
FIG. 2 is a flow diagram illustrating the operation of the method and apparatus of this invention.

FIG. 2 is a flow diagram which illustrates the operation of the system shown in FIG. 1 in the performance of a "help" function. The first step in this operation, step 50, is to determine if a control 18-34 has been operated. If during step 50 a determination is made that a control has not been operated, step 50 is repeated until a control is operated.

When a control is operated, the operation proceeds to step 52 to determine if the control operated is the "help" button 30. If during step 52 it is determined that the operated control is "help" button 30, the operation proceeds to step 54 during which a determination is made as to whether the system is in the "help" mode. If during step 54 a determination is made that the system is not in the "help" mode, the system proceeds to step 56 to cause a "welcome help" screen to be displayed.

Figure 3:
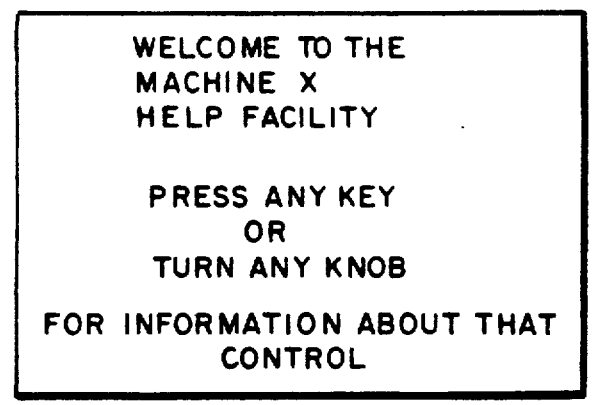
FIG. 3 is a diagram illustrating an exemplary "welcome help" screen display and related material.

FIG. 3 shows an illustrative "welcome help screen". Referring to FIG. 3, it is seen that this screen may contain a message welcoming the user to the "help" facility and telling the user what to do in order to take advantage of the "help" function. In addition, a message may appear in area 38 of the screen (as shown) telling the user how to get out of the "help" function. This also serves as an indication that the system is in the "help" mode. Additional "welcome help" information may be displayed in either area 38 or 40 either in addition to or instead of one of the items indicated above. In some applications different "help" screens may be displayed depending on the state of the system when the "help" mode is entered, whether there is a pop-up screen, or other factors.

Step 56 is performed by recognizing, if necessary, the current state of the system from current state variables stored in memory 42 or in registers in processor 12 and using this information and the fact that "help" button 30 has been operated to address memory 42 to select a appropriate "welcome help" screen to be displayed in area 40. The manner in which the information taken from memory 42 controls the display in area 40 is standard and would be the same as the manner in which information from memory 42 is utilized to control other displays on display 36.

From step 56, the operation proceeds to step 58 during which a "help" mode variable is set, either in processor 12 or in memory 42. It should be noted that the order in which steps 56 and 58 are performed is arbitrary and these steps may be performed in either order. Once the "welcome help" screen is displayed and the "help" mode variable has been set, the operation returns to step 50 waiting for the next control to be operated. Since, as illustrated in FIG. 3, the system is taken out of the "help" mode for the preferred embodiment of the invention by a second operation of the "help" button 30, if during step 54 it is determined that, when the "help" button is operated, the system is already in the "help" mode, the operation proceeds to step 60 to cause the "help" display to be erased from display 36. This would cause the window 40 to disappear and the "help" mode exit message to be erased from area 38. From step 60, the operation proceeds to step 62 to cause the "help" mode variable to be cleared. This results in the system being taken out of the "help" mode. Again, the steps 60 and 62 may be performed in either order. From step 62, the operation returns to step 50 to await the operation of the next system control. If during step 52 it is determined that the control operated is not the "help" control or "help" button 30, the system proceeds to step 64 to determine if the system is in the "help" mode (i.e., if the "help" mode variable is set). If the system is not in the "help" mode at the time the control is operated, the operation proceeds to step 66 to cause the operated control to be decoded and executed in the normal manner. The exact manner in which step 66 is performed will vary with the system utilized. Once execution of the function called for by the operated control is completed, the operation returns to step 50 to await the operation of the next control.

If during step 54 it is determined that the system is in the "help" mode, the system proceeds to step 68 to determine the appropriate "help" text for the operated control and current state variables. As previously indicated, memory 42 stores at least one "help" text for each of the system controls. For soft keys 34 and possibly for selected other system controls which may function differently depending on the state of the system, the system stores a plurality of "help" texts, which texts vary with the state of the system (and thus with the settings of the current state variables). During step 68, the system decodes the operated control and the current state variables and use this information to address the appropriate location in memory 42 to read out the appropriate "help" text. During step 70, the next step in the operation, this appropriate "help" text is displayed in area 40 of display 36.

The particular "help" text which is displayed for a control for a given state of the system will vary with application. Typically, the text will indicate what happens in the system when the control is operated. The text may also contain cautions involving the use of the particular control and procedures to follow if an adverse condition occurs as a result of the control being operated. Other selected information may also be displayed. In particular, the "help" text may advise the user that additional information concerning the control is available and how such additional information may be obtained. Such additional information may for example be obtained by operating a selected key or other control.

The system may also have a hypertext capability which permits the user to move a cursor to any word of a "help" text under control, for example, of the track ball, and to then, on operation of a suitable control, cause all "help" texts containing such word to be sequentially displayed. This capability may require that, for example, the track ball 20 not be disabled when the system is in the "help" mode.

From step 70 the operation returns to step 50 awaiting the operation of the next control. Until such next control is operated, the system continues to display the message displayed during step 70. Once a new control is activated, the system proceeds as described above to determine a new "help" text to be displayed or, if step 60 is performed, to erase the "help" screen 40.

It should be noted that nothing in the operation of FIG. 2 in any way interferes with the normal display of images on screen 36 so that ultrasonic scanning may continue while the "help" function is being performed and ultrasonic images will continue to appear on the screen. The only thing that happens when the system is in the "help" mode is that the operator is unable to cause a change in the functioning of the system by operating at least selected ones of the system controls.

Thus, an interactive "help" function for an electronic system is provided which permits the operator to determine the function of any selected control, whether such control be a key or other digital control or a dial, slider, ball or other analog control, by merely placing the system in the "help" mode and then operating the control in question, or for a control on a pop up screen, by operating the track-ball o other suitable control to select the control on the screen. While the operator is receiving this "help" information, the system continues to perform its normal functions which may also be viewed by the operator. The system has maximum flexibility in that the particular message displayed to the user may vary where appropriate with the current state of the system, so that the "help" message is always appropriate for such current state.

While the system has been particularly described above with respect to an ultrasonic scanning application, it is apparent that the "help" facility could also be utilized with other systems having multiple analog and digital controls, multiple states of operation, and an output display device. The exact analog and digital controls will also vary with application as will the "welcome help" screen displays and the various "help" texts. Thus, while the invention has been particularly shown and described above with reference to a preferred embodiment, the foregoing and other changes in form and detail may be made therein by one skilled in the art without departing from the spirit and scope of the invention.

What is claimed is:

1. In a system which is operable in a plurality of different modes and which has a video display and a plurality of controls, each of which controls is operable to be in a plurality of different states, the state of the control influencing a selected system function; a mechanism for displaying information concerning the system function of at least selected ones of said controls for the current state of the system comprising:
   a help control;
   means responsive to a first operation of said help control for placing said system in a help mode;
   first means operative when the system is in the help mode for disabling the system from responding to the operation of said selected ones of the plurality of controls to influence the corresponding functions, the system operation otherwise continuing substantially unchanged when the system is in the help mode;
   second means operative when the system is in the help mode and in response both to the operations of each of said selected ones of said plurality of controls when the system is in the help mode and to said current state of the system for displaying on said video display selected help information concerning the particular function controlled by the operation of each said selected ones of the plurality of controls; and,
   means for taking the system out of the help mode.

2. A mechanism as claimed in claim 1 wherein said means for taking the system out of the help mode is operative in response to a second operation of said help control.

3. A mechanism as claimed in claim 1 including means for causing the display of said selected information to appear in a window on said video display, the display of data of a type selected prior to entering a help mode continuing while the system is in help mode.

4. A mechanism as claimed in claim 1 wherein said plurality of controls include both analog and digital controls.

5. A mechanism as claimed in claim 1 including means operative when the system is placed in the help mode for displaying a selected help screen.

6. A mechanism as claimed in claim 1 wherein all of said plurality of controls are disabled when the system is in the help mode.

7. A mechanism as claimed in claim 1 wherein said system is an ultrasonic medical imaging system.

8. A mechanism as claimed in claim 1 wherein said selected information is an appropriate help text;
   including memory means, means for storing in said memory means at least one help text for each of said controls, plural help texts being stored for controls which function differently for different states of the system; and
   wherein said second means is operative to retrieve the appropriate help text for the operated control and current system state and to use such retrieved help text to control said video display.

9. In a system which is operable in a plurality of different modes and which has a video display and a plurality of controls, each of which controls is operable to be in a plurality of different states, the state of the control influencing a selected system function, a method for displaying information concerning the system function of any of at least selected ones of said controls for the current state of the system comprising the steps of:

placing said system in a help mode in response to a first operation of a help control;

disabling the system from responding to the operation of selected ones of the plurality of controls to influence the corresponding functions when the system is in the help mode, the system operation otherwise continuing substantially unchanged when the system is in the help mode;

displaying on said video display selected help information concerning the functions controlled by the operation of each of said selected ones of said plurality of controls when the system is in the help mode and in response to the operation each said selected ones of said plurality of controls and the current state of the system; and, taking the system out of the help mode in response to a selected user input.

10. A method as claimed in claim 9 wherein the step of taking the system out of the help mode is operative in response to a second operation of said help control.

11. A method as claimed in claim 9 including the step of causing the display of said selected information to appear in a window on said video display, the display of date of a type selected prior to entering a help mode continuing while the system is in help mode.

12. A method as claimed in claim 9 wherein said plurality of controls include both analog and digital controls.

13. A method as claimed in claim 9 including the step of displaying a selected welcome help screen when the system is placed in the help mode.

14. A method as claimed in claim 9 wherein said system is an ultrasonic medical imaging system.

15. In a system which is operable in a plurality of different modes and which has a plurality of controls and a video display, the video display being adapted to display a selected image, the controls each being operable to any one of a plurality of different states to influence a selected characteristic of the displayed image; a mechanism for displaying information concerning the functioning of said controls for the current state of the system comprising:

a help control;

means responsive to a first operation of said help control for placing said system in a help mode;

first means operative when the system is in the help mode for disabling the system from responding to the operation of at least selected ones of said plurality of controls to influence the corresponding characteristic of the displayed image, the system operation otherwise continuing substantially unchanged when the system is in the help mode;

second means operative when the system is in the help mode and in response both to the operation of each of said selected ones of said plurality of controls when the system is in the help mode and to said current state of the system for displaying on said video display selected help information concerning the particular display characteristic controlled by the operation of each said selected ones of said plurality of controls; and, means for taking the system out of the help mode.

* * * * *